US011700225B2

(12) United States Patent
Boyd et al.

(10) Patent No.: US 11,700,225 B2
(45) Date of Patent: Jul. 11, 2023

(54) EVENT OVERLAY INVITE MESSAGING SYSTEM

(71) Applicant: Snap Inc., Santa Monica, CA (US)

(72) Inventors: Nathan Kenneth Boyd, Los Angeles, CA (US); Benedict Copping, Los Angeles, CA (US); Christie Marie Heikkinen, Santa Monica, CA (US); Celia Nicole Mourkogiannis, Los Angeles, CA (US); David Taitz, Santa Monica, CA (US); Mai Chi Tran, Garden Grove, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/856,811

(22) Filed: Apr. 23, 2020

(65) Prior Publication Data
US 2021/0336916 A1 Oct. 28, 2021

(51) Int. Cl.
*H04L 51/52* (2022.01)
*G06F 3/04817* (2022.01)
*G06F 3/0482* (2013.01)
*H04L 51/10* (2022.01)

(52) U.S. Cl.
CPC ............ *H04L 51/52* (2022.05); *G06F 3/0482* (2013.01); *G06F 3/04817* (2013.01); *H04L 51/10* (2013.01)

(58) Field of Classification Search
CPC ......... H04L 51/32; H04L 51/10; H04L 51/52; G06F 3/04817; G06F 3/0482; G06F 9/451
See application file for complete search history.

(56) References Cited

U.S. PATENT DOCUMENTS

| | | |
|---|---|---|
| 5,754,939 A | 5/1998 | Herz et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |

(Continued)

FOREIGN PATENT DOCUMENTS

| | | |
|---|---|---|
| CA | 2887596 | 7/2015 |
| CN | 115428414 A | 12/2022 |

(Continued)

OTHER PUBLICATIONS

U.S. Appl. No. 17/222,247, filed Apr. 5, 2021, Event Planning in a Content Sharing Platform.

(Continued)

*Primary Examiner* — Adil Ocak
(74) *Attorney, Agent, or Firm* — Schwegman Lundberg & Woessner, P.A.

(57) ABSTRACT

Systems and methods are provided for receiving an ephemeral message, generating an event overlay interface, causing the event overlay interface to be overlaid on top of the ephemeral message, and receiving a selection of an event overlay component via the event overlay interface. The systems and method are also provided for generating a modified event overlay component based on the added plurality of event overlay content, causing the modified event overlay component to be overlaid on top of the ephemeral message, and transmitting the ephemeral message comprising the overlaid modified event overlay component.

20 Claims, 15 Drawing Sheets

(56) References Cited

U.S. PATENT DOCUMENTS

| | | |
|---|---|---|
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,681,393 B1 | 1/2004 | Bauminger et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,818,415 B2 | 10/2010 | Jhanji |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,643,677 B2 | 2/2014 | Suzuki |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,933,967 B2 | 1/2015 | Huston et al. |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,118,723 B1 * | 8/2015 | Su .................... H04L 67/22 |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,639,561 B2 | 5/2017 | Roberts et al. |
| 9,652,896 B1 | 5/2017 | Jurgensen et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,918,193 B1 | 3/2018 | Nguyen et al. |
| 9,961,520 B2 | 5/2018 | Brooks et al. |
| 10,037,498 B2 | 7/2018 | Correll et al. |
| 10,559,107 B1 | 2/2020 | Charlton et al. |
| 11,134,036 B2 | 9/2021 | Taitz et al. |
| 11,418,465 B2 | 8/2022 | Taitz et al. |
| 2002/0047868 A1 | 4/2002 | Miyazawa |
| 2002/0144154 A1 | 10/2002 | Tomkow |
| 2002/0156848 A1 | 10/2002 | Grouse |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0082513 A1 | 4/2010 | Liu |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0066363 A1 * | 3/2011 | Kimishima ............ G01C 21/26 |
| | | 701/532 |
| 2011/0099507 A1 | 4/2011 | Nesladek et al. |
| 2011/0126253 A1 | 5/2011 | Roberts et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2012/0331568 A1 | 12/2012 | Weinstein et al. |
| 2013/0066963 A1 | 3/2013 | Odio et al. |
| 2013/0071093 A1 | 3/2013 | Hanks et al. |
| 2013/0144674 A1 | 6/2013 | Kim et al. |
| 2013/0194301 A1 | 8/2013 | Robbins et al. |
| 2013/0198013 A1 | 8/2013 | Shehan et al. |
| 2013/0212494 A1 | 8/2013 | Heiferman et al. |
| 2013/0290443 A1 | 10/2013 | Collins et al. |
| 2013/0329060 A1 | 12/2013 | Yim |
| 2013/0332856 A1 | 12/2013 | Sanders et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0244640 A1 * | 8/2014 | McCoy .................... G06F 16/48 |
| | | 707/737 |
| 2014/0280566 A1 | 9/2014 | Chen et al. |
| 2014/0282096 A1 | 9/2014 | Rubinstein et al. |
| 2014/0325383 A1 | 10/2014 | Brown et al. |

(56) References Cited

U.S. PATENT DOCUMENTS

| | | |
|---|---|---|
| 2014/0359024 A1 | 12/2014 | Spiegel |
| 2014/0359032 A1 | 12/2014 | Spiegel et al. |
| 2014/0379798 A1 | 12/2014 | Bunner et al. |
| 2015/0170045 A1 | 6/2015 | Kirkham et al. |
| 2015/0199082 A1 | 7/2015 | Scholler et al. |
| 2015/0222580 A1 | 8/2015 | Grue |
| 2015/0227602 A1 | 8/2015 | Ramu et al. |
| 2015/0324826 A1 | 11/2015 | Mizushima |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0148158 A1 | 5/2016 | Marth et al. |
| 2016/0180887 A1 | 6/2016 | Sehn |
| 2016/0191653 A1 | 6/2016 | Aluotto |
| 2016/0253833 A1 | 9/2016 | Lew |
| 2016/0269675 A1 | 9/2016 | Tsujimoto |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0024091 A1 | 1/2017 | Hosier, Jr. |
| 2017/0149699 A1 | 5/2017 | Hinson, Jr. |
| 2017/0161382 A1 | 6/2017 | Ouimet et al. |
| 2017/0177607 A1 | 6/2017 | Fahey |
| 2017/0221095 A1 | 8/2017 | Gauglitz et al. |
| 2017/0263029 A1 | 9/2017 | Yan et al. |
| 2017/0279751 A1 | 9/2017 | Quirarte et al. |
| 2017/0287006 A1 | 10/2017 | Azmoodeh et al. |
| 2017/0295250 A1 | 10/2017 | Samaranayake et al. |
| 2017/0374003 A1 | 12/2017 | Allen et al. |
| 2017/0374508 A1 | 12/2017 | Davis et al. |
| 2018/0013861 A1 | 1/2018 | Howard et al. |
| 2018/0191831 A1 | 7/2018 | Wadley et al. |
| 2018/0241705 A1 | 8/2018 | Sarafa et al. |
| 2018/0253901 A1* | 9/2018 | Charlton ............ H04W 4/021 |
| 2018/0351895 A1 | 12/2018 | Rathod |
| 2019/0287418 A1 | 9/2019 | Rabie |
| 2020/0120170 A1* | 4/2020 | Amitay ................ H04L 51/32 |
| 2020/0177965 A1 | 6/2020 | Fawcett et al. |
| 2021/0006519 A1 | 1/2021 | Taitz et al. |
| 2021/0226904 A1 | 7/2021 | Taitz et al. |
| 2022/0321506 A1 | 10/2022 | Taitz et al. |

FOREIGN PATENT DOCUMENTS

| | | |
|---|---|---|
| WO | 2012000107 | 1/2012 |
| WO | 2013008251 | 1/2013 |
| WO | 2014194262 | 12/2014 |
| WO | 2015192026 | 12/2015 |
| WO | 2016054562 | 4/2016 |
| WO | 2016065131 | 4/2016 |
| WO | 2016/112299 | 7/2016 |
| WO | 2016179166 | 11/2016 |
| WO | 2016179235 | 11/2016 |
| WO | 2017106529 | 6/2017 |
| WO | 2017176739 | 10/2017 |
| WO | 2017176992 | 10/2017 |
| WO | 2018005644 | 1/2018 |
| WO | WO-2021216999 A1 | 10/2021 |

OTHER PUBLICATIONS

"U.S. Appl. No. 16/503,783, Non Final Office Action dated Oct. 16, 2020", 16 pgs.

"U.S. Appl. No. 16/503,783, Response filed Dec. 21, 2020 to Non Final Office Action dated Oct. 16, 2020", 12 pgs.

"U.S. Appl. No. 16/503,783, Notice of Allowance dated Jan. 11, 2021", 11 pgs.

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-bullt-with-snaps/>, (Oct. 3, 2013), 2 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next, big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

"U.S. Appl. No. 16/503,783, Notice of Allowance dated May 27, 2021", 5 pgs.

"International Application Serial No. PCT/US2021/028840, International Search Report dated Aug. 12, 2021", 3 pgs.

"International Application Serial No. PCT/US2021/028840, Written Opinion dated Aug. 12, 2021", 4 pgs.

"U.S. Appl. No. 16/503,783, Corrected Notice of Allowability dated Sep. 2, 2021", 2 pgs.

Castelluccia, Claude, "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National institutes of Health, (Mar. 1998), 28 pgs.

Leyden, John, "This SMS will self-destruct in 40 seconds", [Online] Retrieved from the Internet: URL: http: www.theregister.co.uk Dec. 12, 2005 stealthtext, (Dec. 12, 2005), 1 pg.

Melanson, Mike, "This text message will self destruct in 60 seconds", [Online] Retrieved from the Internet: URL http: readwrite.com Feb. 11, 2011 this_text_message_will_self_destruct_in_60_seconds, (Feb. 18, 2015), 4 pgs.

Sawers, Paul, "Snapchat for iOS Lets You Send Photos to Friends and Set How long They're Visible For", [Online] Retrieved from the Internet: URL: https: thenextweb.com apps May 7, 2012 snapchat-for-ios-lets-you-send-photos-to-friends-and-set-how-long-theyre-visible-for , (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: URL: http: www.eweek.com print c a MessagingandCollaboration StealthTextShouldYouChoosetoAcceptIt, (Dec. 13, 2005), 2 pgs.

"U.S. Appl. No. 17/222,247, Non Final Office Action dated Jan. 5, 2022", 9 pgs.

"U.S. Appl. No. 17/222,247, Notice of Allowance dated Apr. 12, 2022", 11 pgs.

"U.S. Appl. No. 17/222,247, Response filed Mar. 22, 2022 to Non Final Office Action dated Jan. 5, 2022", 7 pgs.

"U.S. Appl. No. 17/222,247, Corrected Notice of Allowability dated Jul. 7, 2022", 2 pgs.

"U.S. Appl. No. 17/843,858, Non Final Office Action dated Jan. 5, 2023", 8 pgs.

"International Application Serial No. PCT/US2021/028840, International Preliminary Report on Patentability dated Nov. 3, 2022", 6 pgs.

"U.S. Appl. No. 17/843,858, Notice of Allowance dated Mar. 17, 2023", 11 pgs.

* cited by examiner

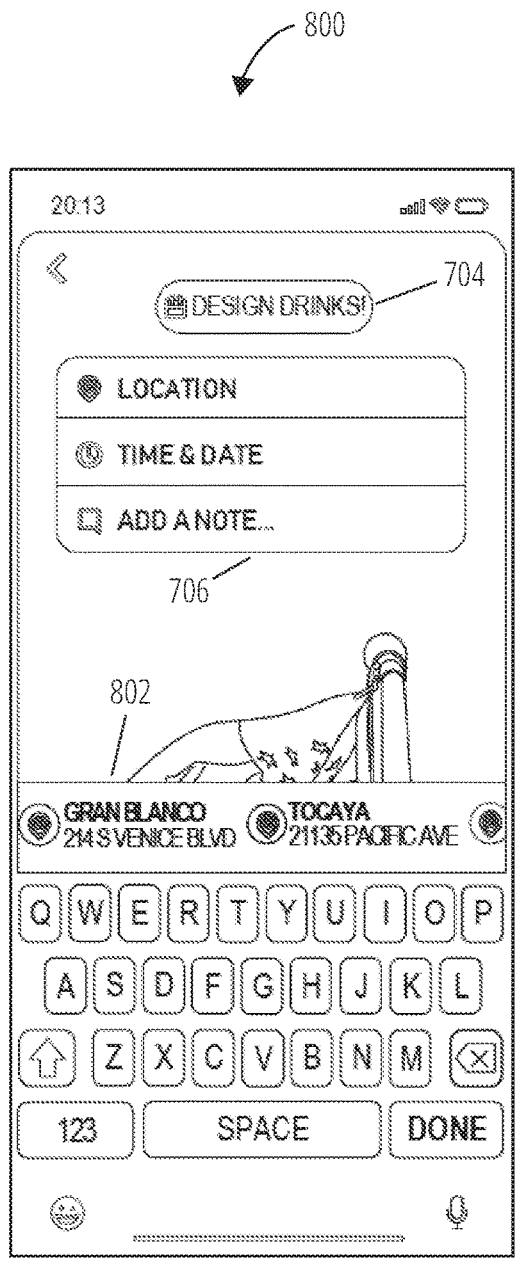 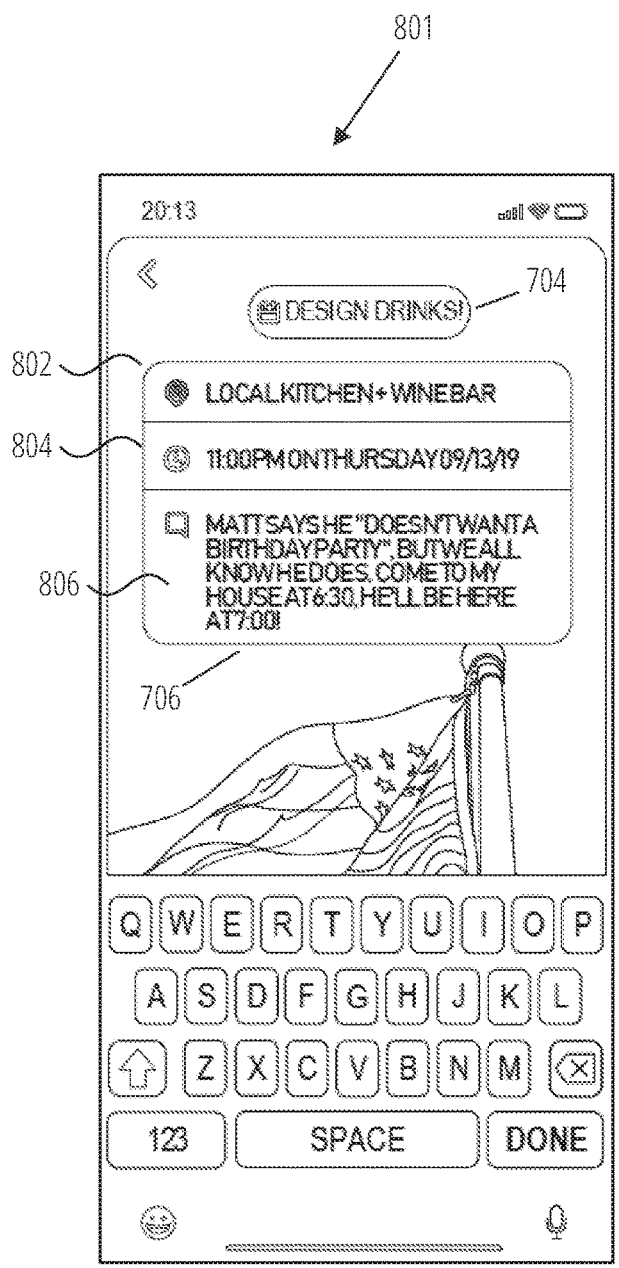
FIG. 8A  FIG. 8B
FIG. 8

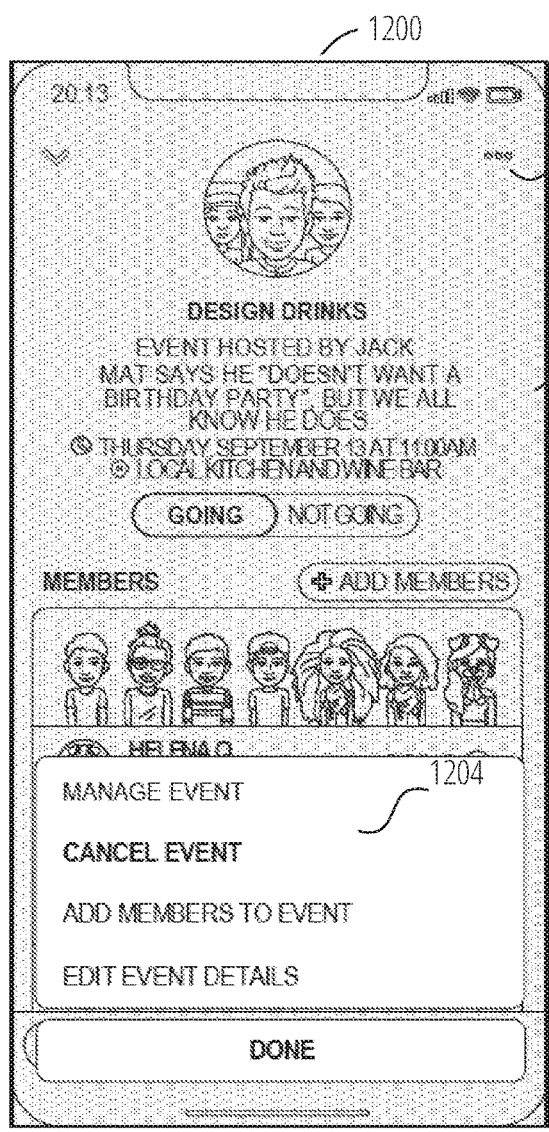
FIG. 12A
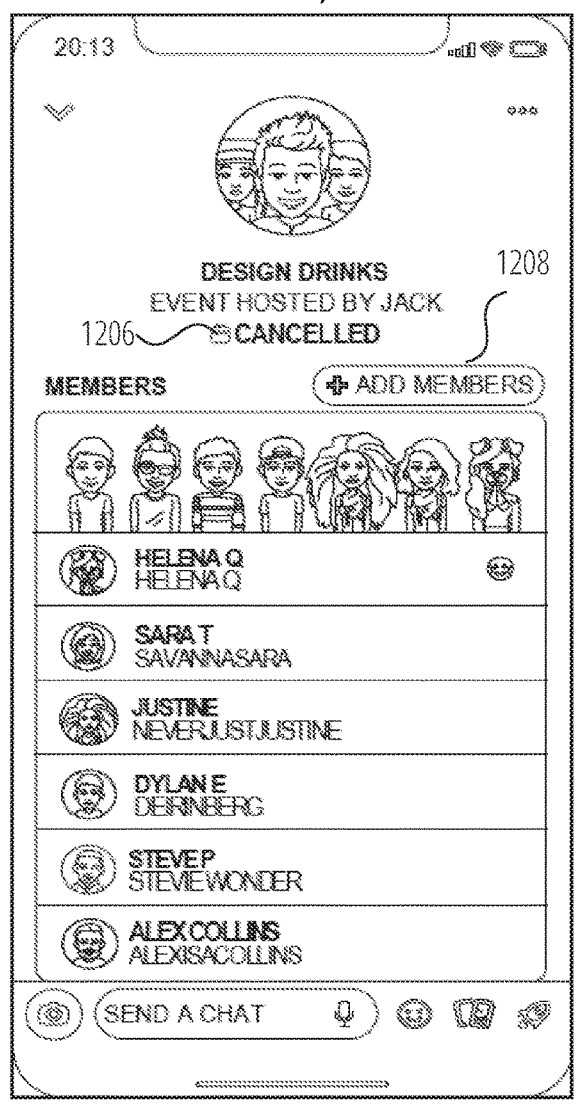
FIG. 12B
FIG. 12

EVENT OVERLAY INVITE MESSAGING SYSTEM

BACKGROUND

Social media sharing platforms allow users to share millions of messages between mobile devices within a social network environment. Users the social network can share media content, such as audio, images, and video between their perspective user devices (e.g., mobile devices, personal computers). The social media sharing platforms may further allow users to set up events and send messages with other users by exchanging text messages.

As the popularity of mobile based social networking systems continues to grow, users increasingly share media content items, such as electronic images, animations, or videos with each other. These media content items are typically uniquely personalized, and thus, reflect a demand to encourage electronic visual communication on a global scale.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 8A and 8B illustrate an example user interface of an event editor interface in accordance with one embodiment.

FIGS. 12A and 12B illustrate an example user interface 1200 depicting an event modifier interface 1204 in accordance with one embodiment

DETAILED DESCRIPTION

As mentioned above, users within a social networking system send media content to each other for various reasons. Most of the media content sent includes images and video. Users have an increasing need to attach or overlay customizable media overlay data objects to the media content that invite the recipients to join into a group or event, whether that be virtually or in the real world.

When sending media content between users, it is paramount that the social networking systems provide the ability to customize, edit, and modify the invites either during the generation stage the media content or after the media content has been saved in memory of the user device. Having these capabilities improves interconnectivity and interactivity of the end user dramatically.

In at least one embodiment of the present disclosure, a system is provided that improves on the functionality of allowing a user in a social network system to create, configure, and edit a user group invite event media overlay that is overlaid on top of a content collection or ephemeral message upon being transmitted to another user within the social network system. The system allows recipients of the event media overlay to interactively join into an event group upon receiving a content collection, ephemeral message, private ephemeral message or ephemeral content collection.

Embodiments of the present disclosure improve the functionality of event media overlay generation systems in electronic messaging and imaging software systems by generating novel interface components during the creation of the event overlay system and overlaying the event media overlays on top of the ephemeral message or content collection associated with media overlay icons and by minimizing the delay in executing an interactive group event session using event overlay icons thereby simplifying and technologically enhancing the animation and content collection generation process.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
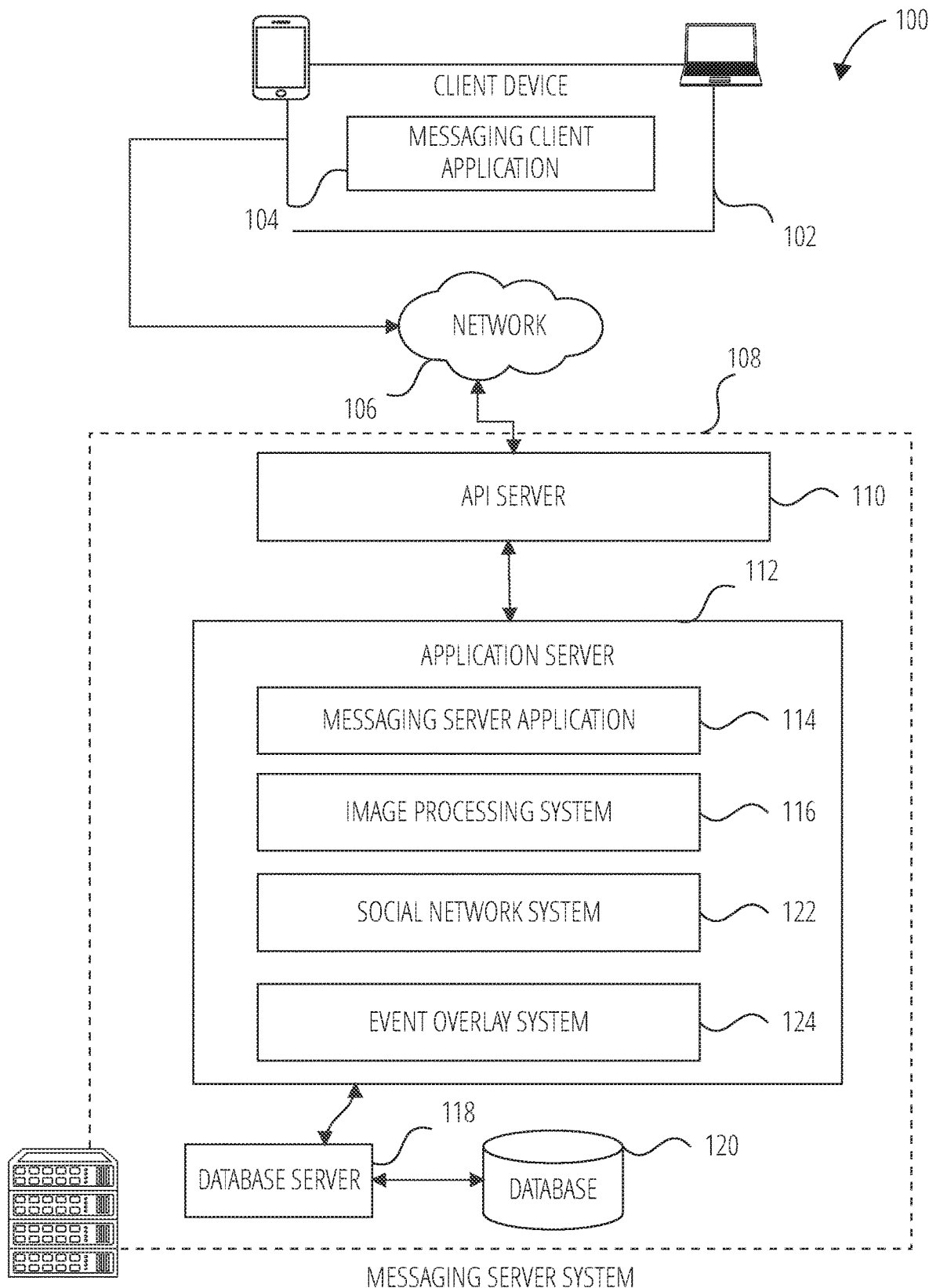
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, Client Device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., content collection), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122, and an event overlay system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called content collections or galleries). These collections are then made available, by the messaging server application 114, to the messaging client application 104. Other Processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
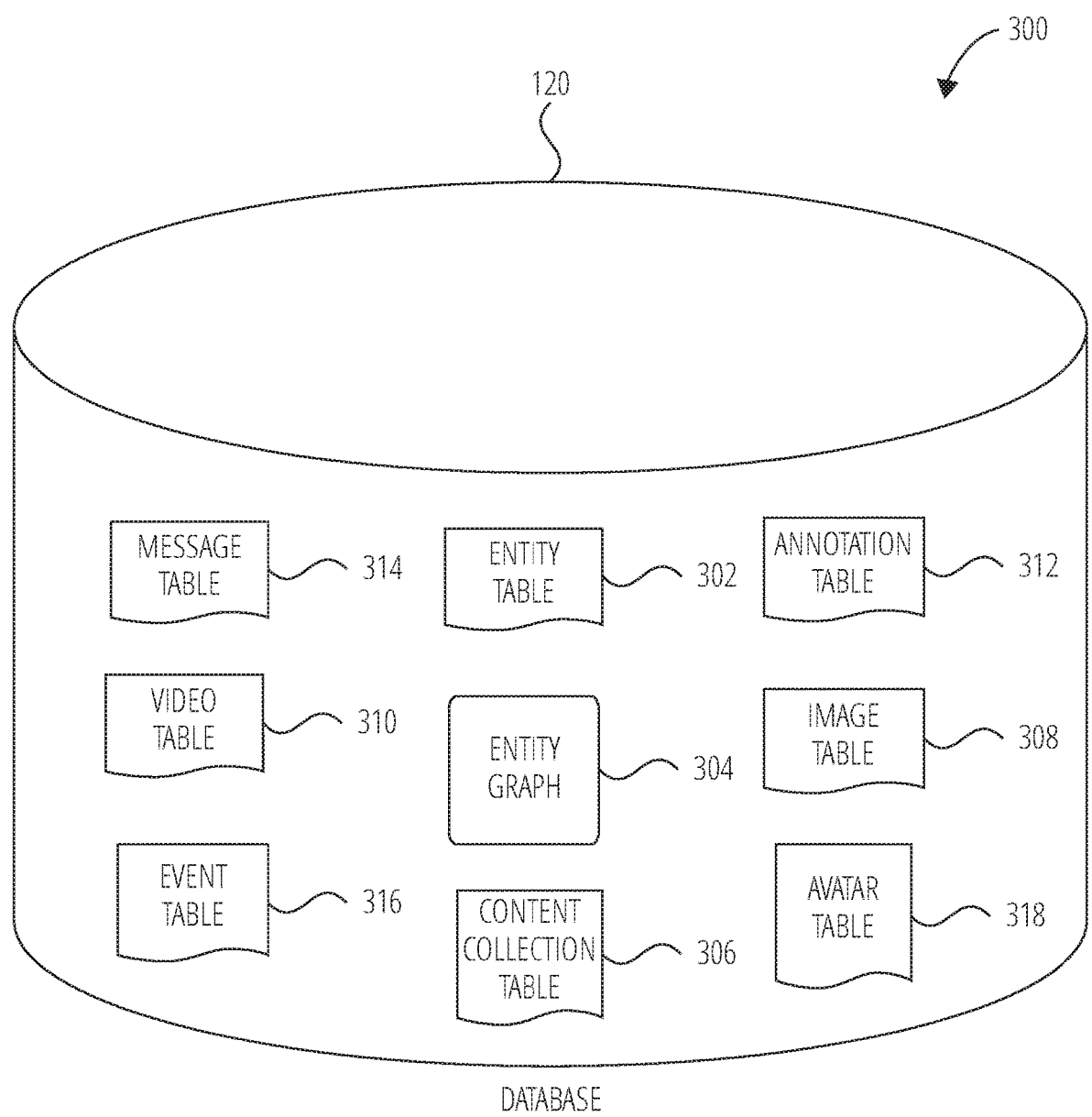
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 also includes the event overlay system 124 that is dedicated to executing the functions described herein. In one example, the event overlay system 124 is configured to execute instructions including generating an event overlay interface, causing the event overlay interface to be overlaid on top of an ephemeral message, generating a modified event overlay component based on an added plurality of event content, and transmitting the ephemeral message that includes the overlaid modified event overlay component to another computing device.

The application server 112 is communicatively coupled to a database server 118, which facilitates access to a database 120 in which is stored data associated with messages processed by the messaging server application 114.

Figure 2:
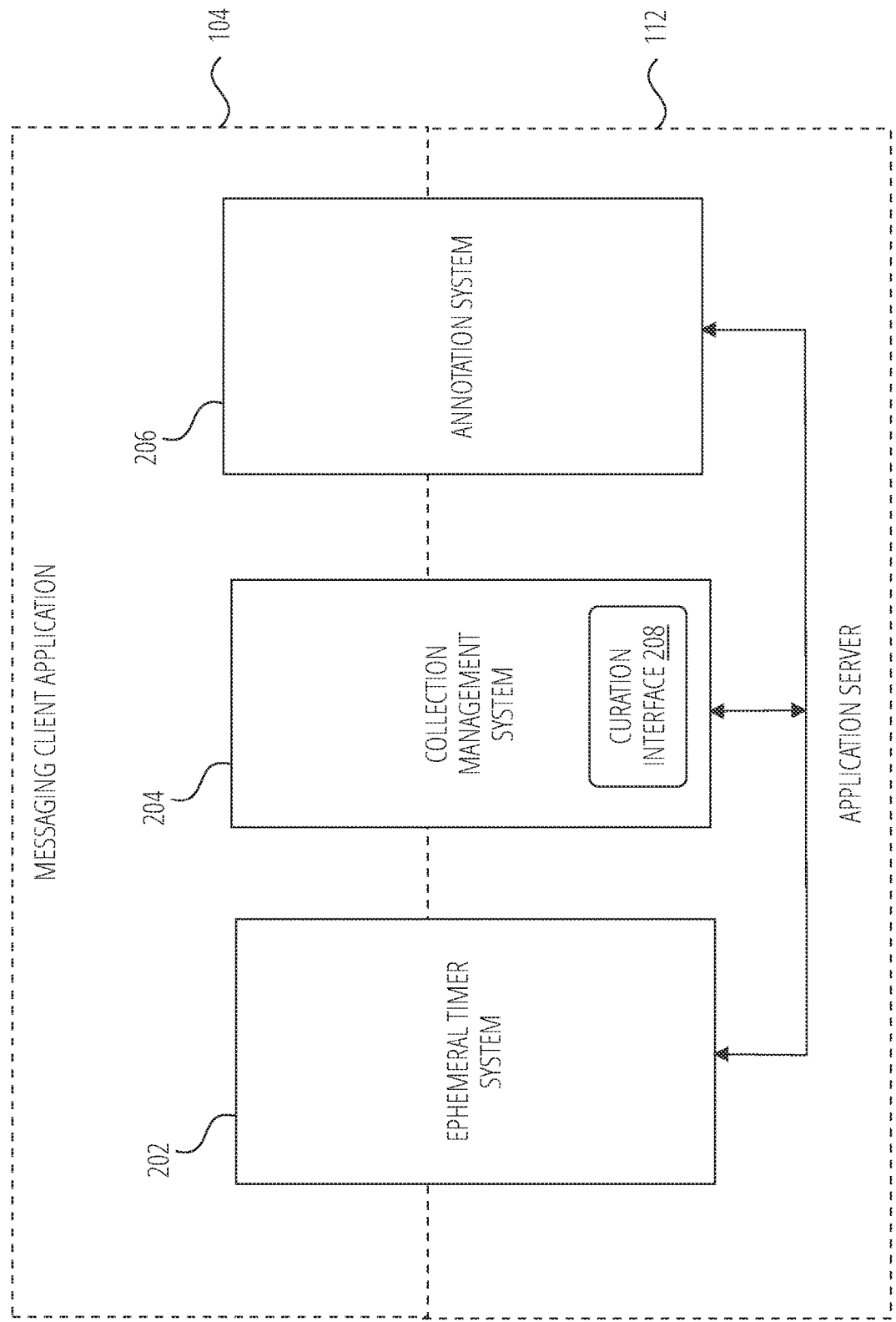
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a content collection), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event content collection." Such a collection may be made available for a specified time period, such as the duration of an event to which the content relates. For example, content relating to a music concert may be made available as a "content collection" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102.

A media overlay, or for example, a event overlay component, may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House).

In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message.

Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 are augmented reality content items (e.g., corresponding to applying Lenses or augmented reality experiences). An augmented reality content item may be a real-time special effect and sound that may be added to an image or a video.

As described above, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip.

For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation.

In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A content collection table 306 stores data regarding collections of messages and associated image, video, or audio data, which are compiled into a collection (e.g., a content collection or a gallery). The creation of a particular collection may be initiated by a particular user (e.g., each user for which a record is maintained in the entity table 302). A user may create a "personal content collection" in the form of a collection of content that has been created and sent/broadcast by that user. To this end, the user interface of the messaging client application 104 may include an icon that is user-selectable to enable a sending user to add specific content to his or her personal content collection.

A collection may also constitute a "live content collection," which is a collection of content from multiple users that is created manually, automatically, or using a combination of manual and automatic techniques. For example, a "live content collection" may constitute a curated stream of user-submitted content from varies locations and events. Users whose client devices have location services enabled and are at a common location event at a particular time may, for example, be presented with an option, via a user interface of the messaging client application 104, to contribute content to a particular live content collection. The live content collection may be identified to the user by the messaging client application 104, based on his or her location. The end result is a "live content collection" told from a community perspective.

A further type of content collection is known as a "location content collection", which enables a user whose client device 102 is located within a specific geographic location (e.g., on a college or university campus) to contribute to a particular collection. In some embodiments, a contribution to a location content collection may require a second degree of authentication to verify that the end user belongs to a specific organization or other entity (e.g., is a student on the university campus).

The avatar table 318 can store personalized avatars associated with a user profile of the client device 102. In another example, the personalized avatars can be associated with user profiles who receive an event media overlay and interactively join the event or group via the event media overlay. The avatar table 318 can provide the associated avatar for inclusion into the avatar interface and eventual transmission or communication to a second computing device while accessing and viewing the content collection.

The event table 316 stores data related to an event. For example, the event table 316 stores details of an event, name, time, date, location, comments, images, and pictures related to the events, as well as, logged events (e.g., actions) corresponding to the event (e.g., when a user joins the event, when a user invites another users, when details of the event change), links to chat sessions for the event (e.g., a link to chat sessions in the chat history table 316), tokens for the event, and so forth.

Figure 4:
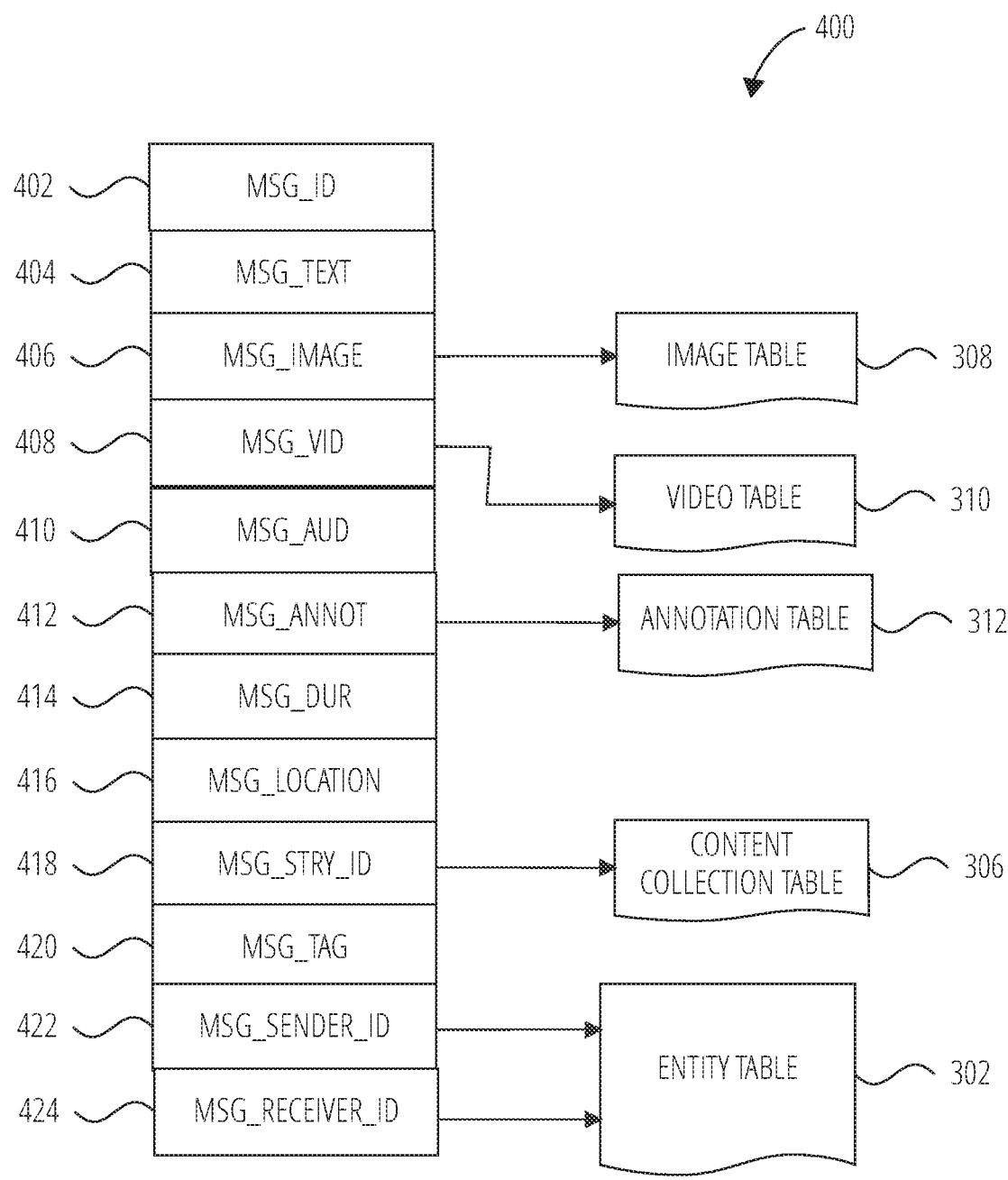
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from a memory component of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from a memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "content collections") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent
- A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a content collection table 306, and values stored within the message sender identifier 422 and the message receiver identifier 424 may point to user records stored within an entity table 302.

Figure 5:
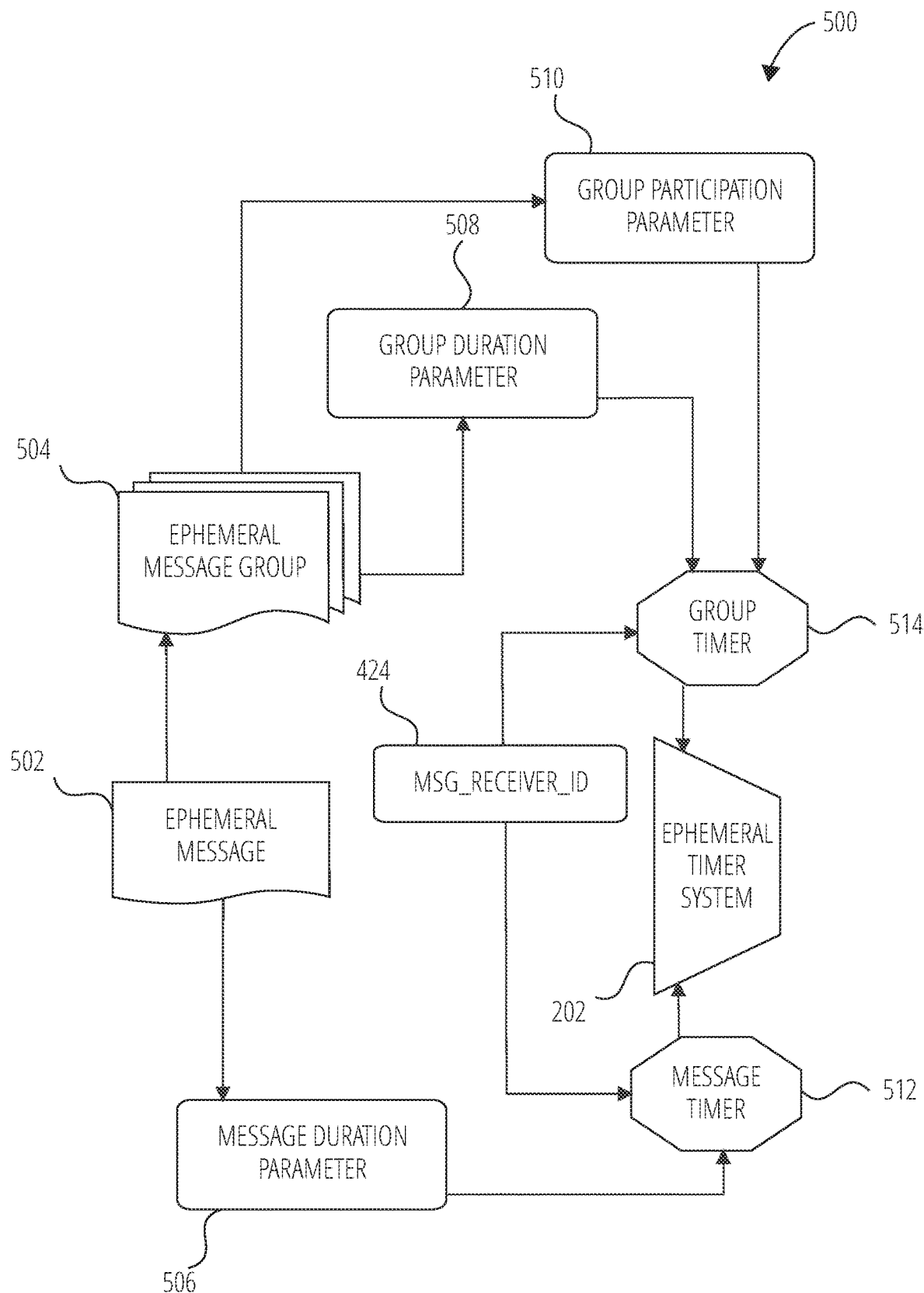
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the Ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal content collection, or an event content collection). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
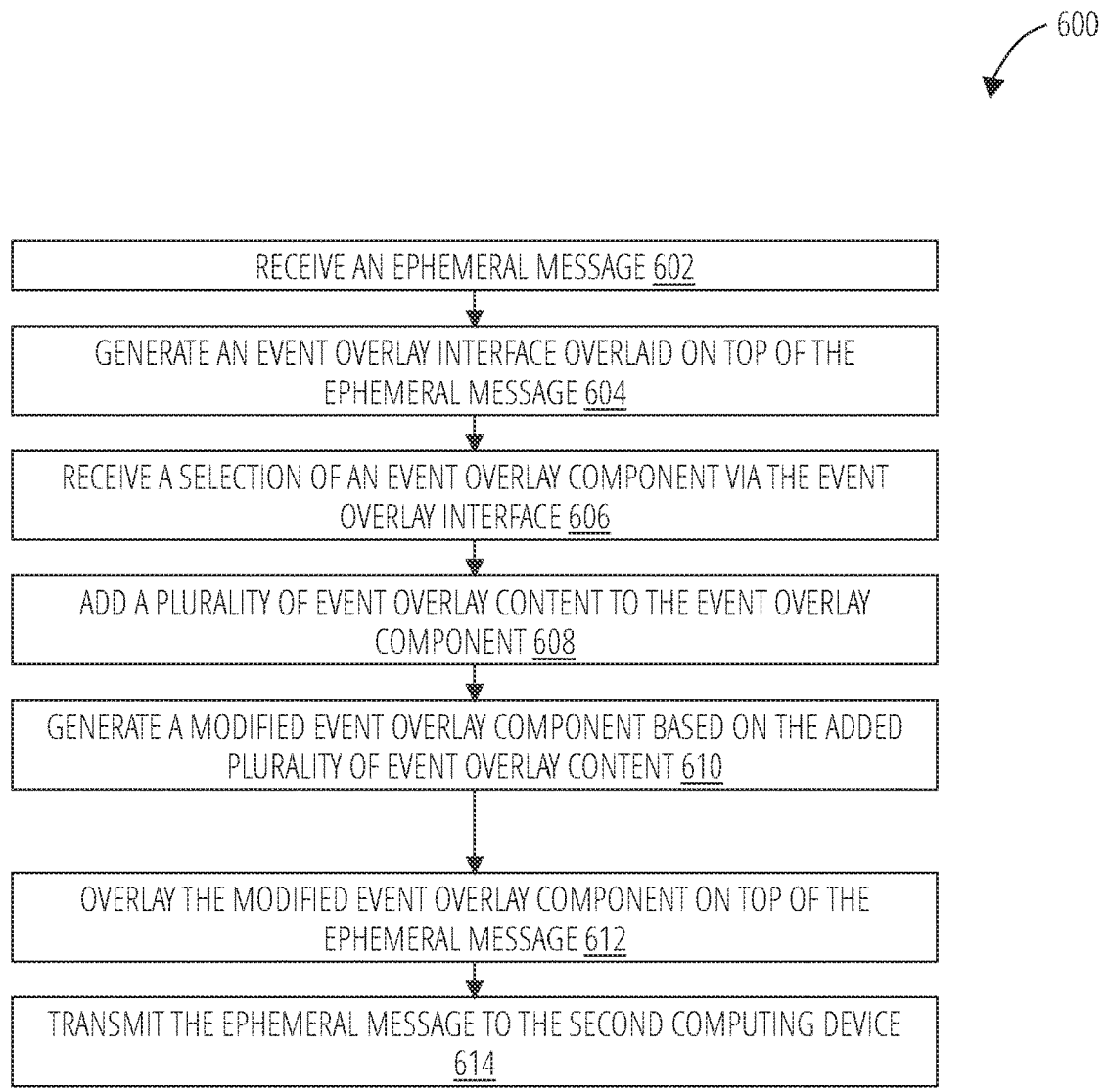
FIG. 6 illustrates a flowchart for generating an event overlay component in accordance with one embodiment.

FIG. 6 illustrates a flowchart for generating an event overlay component in accordance with one embodiment. In operation 602, a computing device (e.g., client device 102) receives an ephemeral message. In one example, the ephemeral message includes a media content item, such as a picture, video, photograph, or image, and is associated with a predetermined message duration parameter 506. In one example, the computing device can receive the ephemeral message from another computing device, such as a smartphone, laptop, mobile device, and so forth. In one example embodiment, a user captures a media content item via a camera device of the computing device and uses the captured media content to generate the ephemeral message. The computing device can display the captured image or video on a display area of the computing device and provide an option (e.g., an interface element) to add a media overlay (e.g., the event overlay or other media overlay) to the captured media content item. In one embodiment, the ephemeral message 502 is viewable by a receiving user for up to a maximum of 10 seconds, depending on the amount of time that a sending user specifies using the message duration parameter 506.

In another embodiment, instead receiving an ephemeral message, the computing device receives a content collection, ephemeral content collection, a video, image, photograph, or media content item shared between computing devices (e.g., mobile devices, smartphones, personal computers, and so forth). In one example embodiment, a user captures a media content item via a camera device of the computing device. For example, the user captures an image (e.g., photograph) or video. The computing device can display the captured image or video on a display area of the computing device and provide an option (e.g., an interface element) to add a media overlay to the captured media content item.

In operation 604, the computing device generates an event overlay interface and overlays the event overlay interface on top of the ephemeral message. In one example, the event overlay interface comprises a database of event overlay components from which the user of the computing device can choose from. In another example, the user can select one or more event overlay components from an interactive menu of the event overlay interface. The selected one or more event overlay components are added to the ephemeral message or media content item (e.g., to augment the media content item by overlaying the event overlay component on top of the media content item). The computing device automatically generates the event overlay interface in response to a user selection of an event overlay component, in response to capturing media content, or in response to generating an ephemeral message, content collection, or ephemeral content collection. In operation 606, the computing device receives a selection of an event overlay component via the event overlay interface.

In operation 608, the computing device receives a plurality of event overlay content added to the event overlay component. For example, the event overlay component includes an event editor interface. The user of the computing system, also known as the creator, enters event overlay content (e.g., event details, event information, or event knowledge) into the event editor interface of the event overlay component. The event overlay content includes, but is not limited to, a title of the event, location information related to the event, a suggested location based on predetermined location criteria such as previously stored location information, location information received from another computing device, or location information captured by the computing device via camera device, time and date information related to the event, and a description relating to the event. The user can enter any alpha-numeric character string as the event overlay content via a keyboard, user gesture, voice, or other means.

in operation 610, generates a modified event overlay component based on the added plurality of event overlay content. The user can also edit or modify event details or event overlay content according to a user response. The event overlay component also includes a user profile associated with the user device. Information from the user profile can be accessed and imported into the event overlay component or the event editor interface. Once event overlay content is entered into event editor interface of the event overlay component, the computing device receives the event overlay content.

In operation 612, the computing device overlays the modified event overlay component on top of the ephemeral message. In one example embodiment, modified event overlay component can be overlaid in any area of the ephemeral message or media content and can be moved around to different locations on the media content item. The modified event overlay component can also be rotated (e.g., so that it is at a different orthogonal angle), enlarged or compressed. In one example, the modified event overlay component can have the color changed, font changed, and so forth. In some example embodiments, the modified event overlay component is automatically resized based on the content provided for the event. In operation 614, the computing device transmits, to a second computing device, the ephemeral message comprising the overlaid modified event overlay component. The ephemeral message is received by the second computing device and displayed on a user interface of the second computing device.

Figure 7:
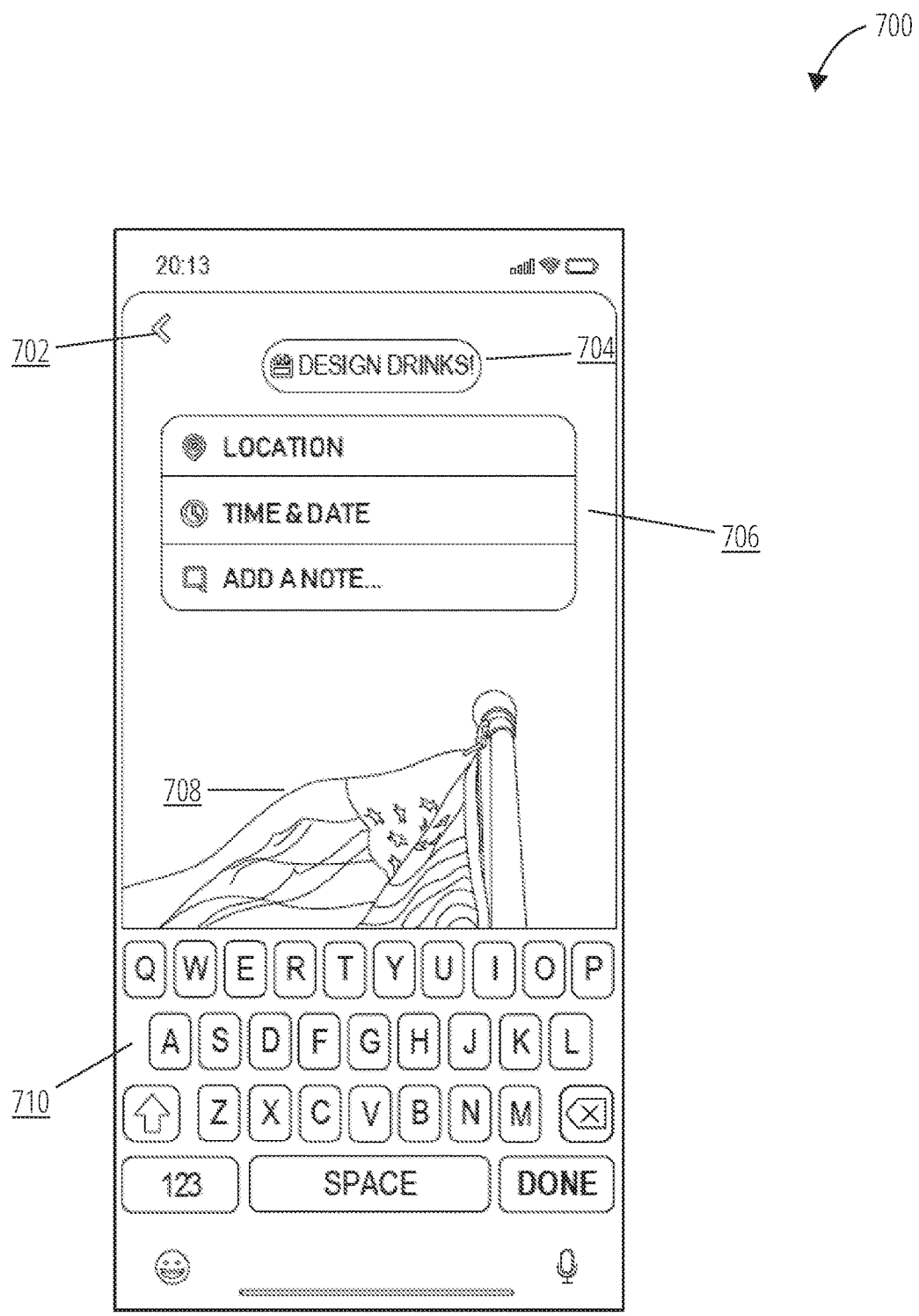
FIG. 7 illustrates an example of a user interface of an event overlay component in accordance with one embodiment.

FIG. 7 illustrates an example user interface 700 displayed on a computing device (e.g., client device 102) in accordance with one embodiment. The user interface 700 depicts an event overlay component 704 displayed by the computing device in accordance with one embodiment. The event overlay component 704 is shown overlaid on a media content item 708.

The media content item 708 is an image of the American flag, however, the media content item 708 may be any image, video, animation, content collection, ephemeral message, or ephemeral content collection. For illustration purposes, the media content item 708 is an ephemeral message.

The user interface 700 further comprises a back button 702. The back button can be selected to display a previous page or different page previously viewed on the computing device.

The event overlay component 704 further comprises an event editor interface 706 in which the user of the computing device enters event overlay content. For example, the user can enter a title of the event, location information related to the event, time and date information related to the event, and a note or description relating to the event. The event overlay component 704 also includes a user profile associated with the user device (not shown).

In one example, the event editor interface 706 is a combination of data fields designed to receive user input in the form of an alpha-numeric character string. The alpha-numeric character string may also be referred to as caption data, content data, or event overlay content. The computing device via the event editor 706 receives the added content from the user of the client device 102 via the keyboard interface 710, a user gesture, voice input, an external input device, or the like.

In another example, once the user selects an event overlay component 704, a title field is highlighted by default and entry of any other applicable event content is optional. Once the user entered at least a title of the event, the user can tap the back button 702, for example, to save changes or additions to the content within the event editor 706.

As mentioned previously, FIGS. 8A and 8B illustrate example user interfaces 800 and 801 in accordance with one embodiment. The user interfaces 800 and 801 each depict the event overlay component 704 containing added event overlay content 806 being displayed by the client device. As shown in FIG. 8A, the information pertaining to the event, which in one example is referred to as event overlay content, may included location information, time and date information, and a note or description information.

In one example, the location information 802 is generated and displayed in a separate portion of the event overlay component 704. In one example, the computing device auto-populates mapping location and coordinates, and also provides suggestions according to the current location of the device or the location of the event destination as the user enters content pertaining to the event. For example, if the user device is located at 123 Main Street and the event information entered pertains to a bowling alley, the computing device will access a third party mapping server to determine bowling alleys within the vicinity of the user device.

In FIG. 8B, example event overlay content 802, 804, and 806 is displayed within the fields of the event overlay editor 706. For instance, the user entered the title as "Design Drinks!" which is displayed in the event overlay component 704. In this example, the location information 802 is an auto-populated suggestion corresponding to the location of the user device and event information entered by the user.

In the example shown in FIG. 8B, the location information 802 and date and time information 804 is the "Local kitchen+Wine Bar 11:00 PM on Thursday 9/13/19". The user also entered description information 806 in the event overlay editor 706 stating "Matt says he doesn't want a birthday party, but we all know he does, come to my house at 6:30, he'll be here at 7:00!" In this example, the location information 802, date and time information 804, and the description information 806 are input into the event overlay editor 706 of the event overlay component 704 by the user. The user can also edit or modify any field within the event editor interface 706 including the location information 802, data and time information 804, or the description information 806.

Figure 9A:
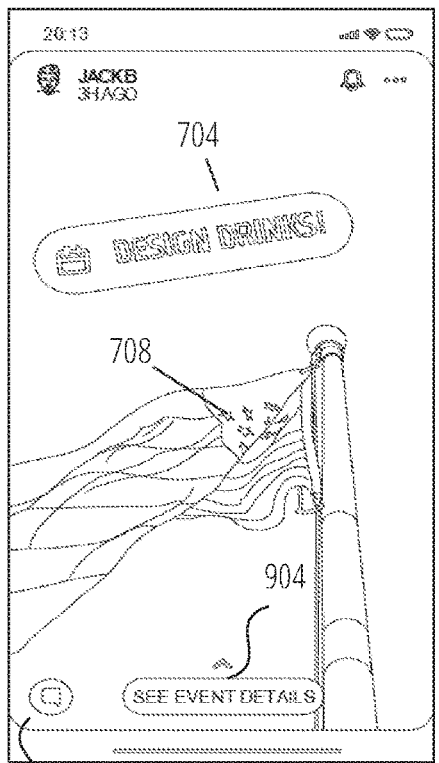
FIGS. 9A, 9B, and 9C illustrate example user interface of the client device in accordance with the one embodiment.
Figure 9B:
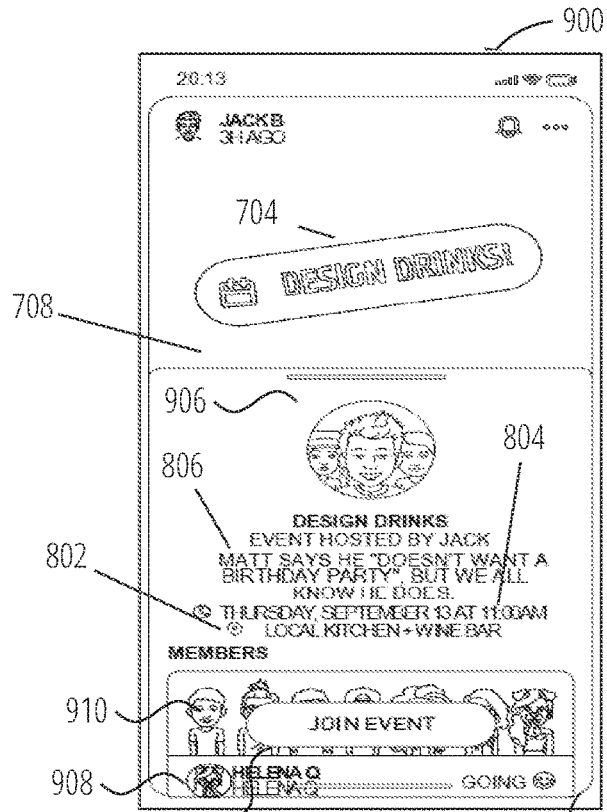
Figure 9C:
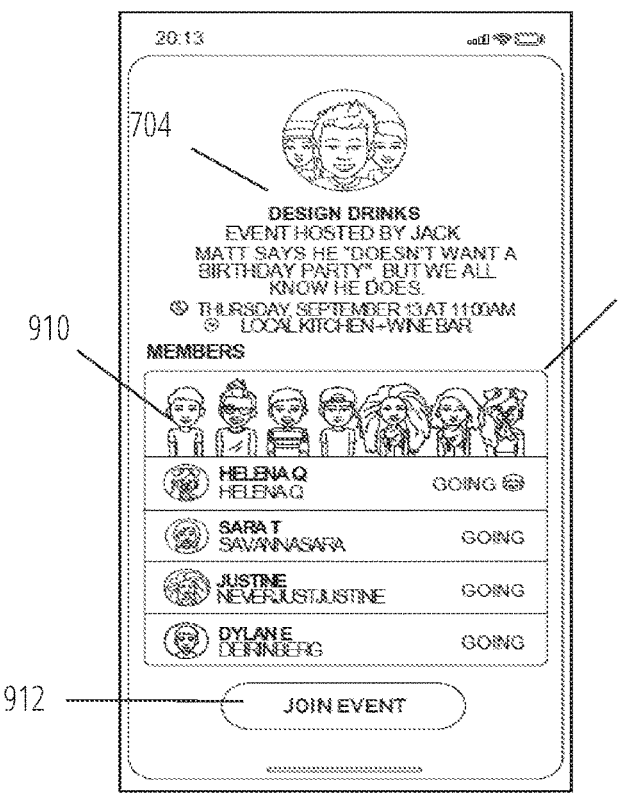

FIGS. 9A, 9B, and 9C illustrate example user interfaces in accordance with the one embodiment. As shown in FIG. 9A, the event overlay component 704 is overlaid on top of ephemeral message 708. In the present example, the ephemeral message 708 contains media content pertaining to an image of an American Flag. The ephemeral message 708 corresponds to the generated ephemeral message 708 transmitted to a second computing device. The event overlay component 704 contains the title "Design Drinks!" as previously depicted in FIGS. 8A and 8B. A messaging icon 902 and event detail button 904 are also shown at the bottom portion of the ephemeral message 708.

The messaging icon 902 alerts the user whether a message, email, ephemeral message, content collection, or ephemeral content collection is received, viewed, non-viewed, expired, transmitted, or the like. The event detail button 904 activates the event content and associated details of the event overlay component 704.

In FIG. 9B, the event overlay component 704 is overlaid on top of the ephemeral message 708 and upon accessing the event overlay component 704, in one example, a modified event overlay component 906 is generated containing the event overlay content information 806, e.g. location information 802, time and date information 804, and the description information 806 previously entered by the user using the event overlay editor 706. In one example, an event overlay messaging interface 908 is generated at the bottom portion of the modified event overlay component 906.

The event overlay messaging interface 908 displays one or more avatars 910 associated with each user that has received the event overlay component 704 via the ephemeral message 708 and has interactively joined the event via accessing an interactive join option 912 (explained in further detail below). Each generated avatar 910 is displayed in a separate section 914 of the event overlay message interface 908. In one example, the generated modified event overlay component includes the information entered into the event editor interface of the event overlay component, an event overlay messaging interface, and at least one or more avatars 910 associated with each user that has received the event overlay component via the ephemeral message and has interactively joined the event via accessing an interactive join option (explained in further detail below). Each generated avatar 910 is displayed in a separate section of the event overlay message interface. The modified event overlay component also includes an extended event profile interface, status notification icon, interactive map section, message section, and message attachment section (explained below).

As shown in FIG. 9C, the event overlay messaging interface 908 is extended to depict the separate section 914 of the event overlay message interface 908 containing the avatars 910 associated with each user that has received and joined or accepted the invitation described in the event details shown in the event overlay component 704. In one example, when the user receives an ephemeral message 708 (or any other media content, e.g. content collection, image, video, message) that contains an event media component 704. Upon activating the interactive join option 912, the computing device accesses the user profile of the user that has activated the interactive join option 912 and adds that user to an event overlay directory associated with the event as a member of the event depicted and described in the event overlay component 704. For example, the computing device transmits the user profile information to a third computing device, such as a server, in order to include the user in the event overlay directory. In another example, upon activating interactive join option 912, the computing device generates an event overlay status icon depicting that the user is attending the event as shown in the extended separate section 914 of the event overlay message interface 908.

Figure 10:
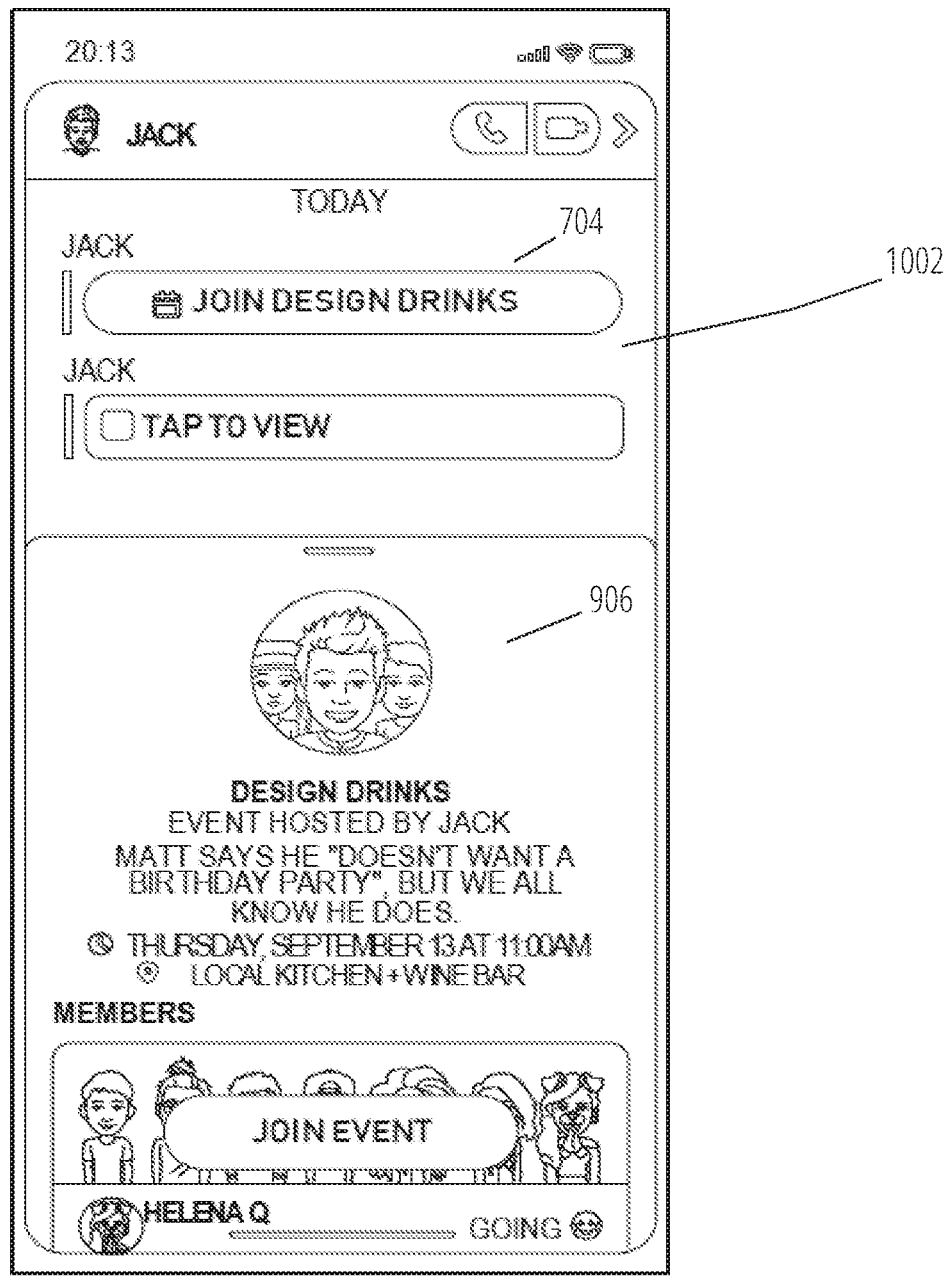
FIG. 10 illustrates an example user interface depicting an event overlay component in accordance with one embodiment.

FIG. 10 illustrates an example user interface 1000 depicting an event overlay component 704 from a chat interface 1002 in accordance with one embodiment. In one example, the ephemeral message with the event overlay component is transmitted from the ephemeral message chat interface 1002 to a second computing device. Once the ephemeral message has been received and viewed, the ephemeral message with the event overlay component is deleted upon determination that a predetermined period of time has elapsed, in accordance with the description in FIG. 5.

Figure 11:
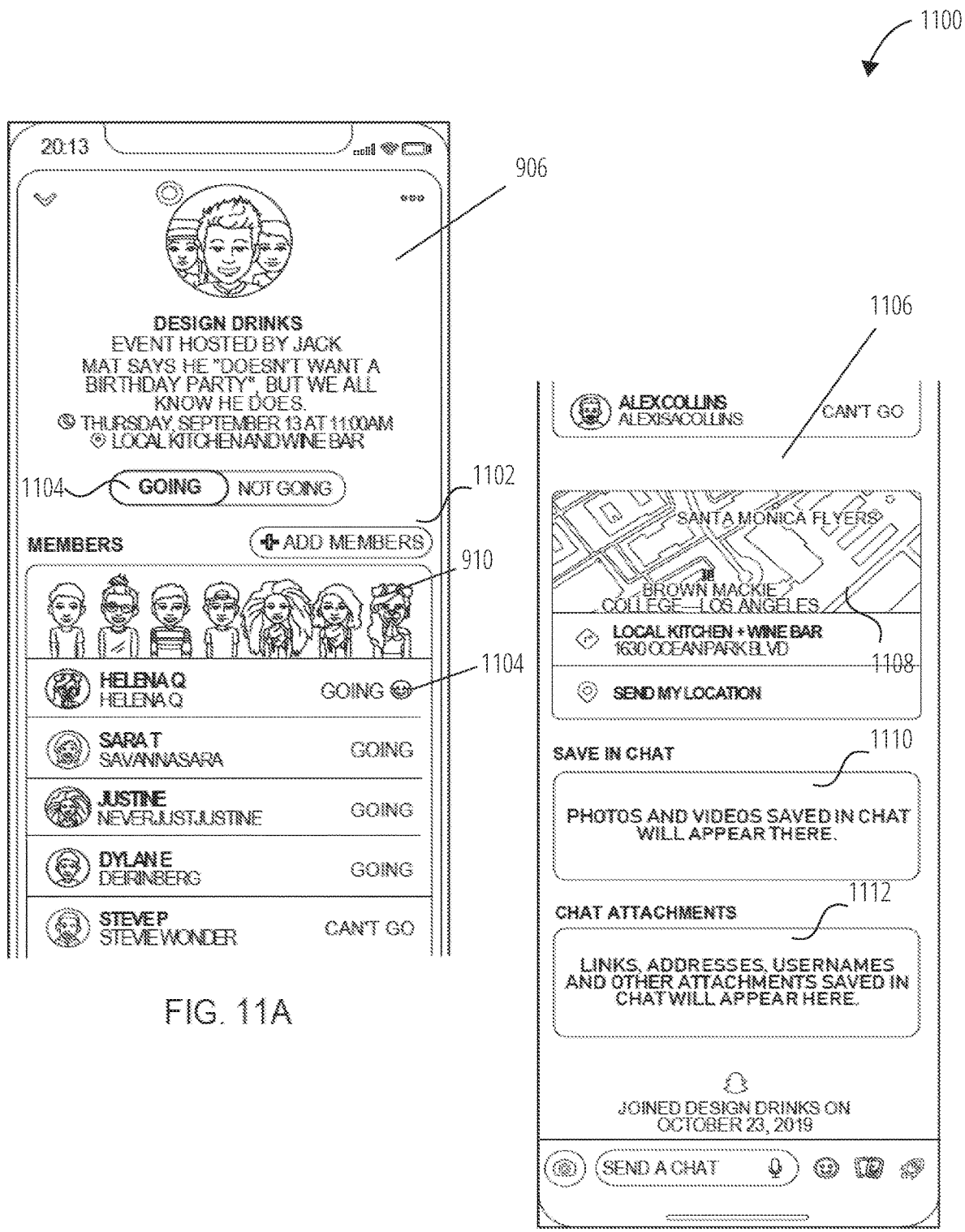
FIGS. 11A and 11B illustrate an example user interface 1100 depicting the modified event overlay component 906 with an extended event profile interface 1106 in accordance with one embodiment.

FIGS. 11A and 11B illustrate an example user interface 1100 depicting the modified event overlay component 906 with an extended event profile interface 1106, in accordance with one embodiment. In one example, once a user has created the event overlay component 704 and invited other users, or once a user has received and interactively joined the event associated with the event overlay component 704, the modified event overlay component 906 as shown, displays a generated status notification icon 1102, and one or more avatars 910 associated with each user that has received the event overlay component 704 and has interactively joined the event after accessing the interactive join option 912 displayed in the extended separate section 914 of the event overlay message interface 908. In one example, the event overlay status icon 1104 is a two-tier interactive button 1104 depicting "Going" and "Not-Going" or an emoji, graphical image, or avatar.

As shown in FIG. 11B, the modified event overlay component 906 also includes an extended event profile interface 1106 that displays a generated interactive map section 1108, message section 1110, and a message attachment section 1112. In another example, the interactive map section 1108 displays an indication of the event on the map (not shown) at a location corresponding to the event and within a time period corresponding to the time of day of the event. The indication is in the form of a flag, avatar of the users attending the event, a 2D or 3D graphical object, other indication or combination of indications. In one example, upon activating the interactive map section 1108, driving, public transport, or walking directions are activated and displayed on the user device. The driving, public transport, or walking directions are also included in the message attached section 1112.

The message section 1110 contains a chat session between users that have joined the event, in which a user joining an event can view messages in the chat session that occurred after the user joined the event. Any messages in the chat session before the user joined are visible to other users who have already joined, but not to the new user that has just joined. Any messages in the chat session that occur after the new user has joined, will be visible by the new user. In another example embodiment, when the user joins the event, the user can view all messages that that occurred before joining.

In another example embodiment, when the user joins the event, the user can view all messages that that occurred before joining. The message attached section 1112 retains and displays any computing component that was transferred or saved during the message section 1110 chat session between users that have joined the event. For example, links to websites, addresses, usernames, images, videos, and any other forms of electronic media that were saved or transmitted during the chat session are depicted in the message attachment section 1112.

FIGS. 12A and 12B illustrate example user interfaces 1200 and 1201 each depicting an event modifier interface 1204 in accordance with one embodiment. In one example, the user navigates to an event modifier interface 1204 stored as an option within the menu icon 1202 at the top portion of the modified event overlay component 906 as shown in FIG. 12A. Although the menu icon 1202 is described as accessing the event modifier interface 1204, any graphical icon or object can be used. The event modifier interface 1204 is generated depicting four options: (1) manage event; (2) cancel event; (3) add members; and (4) edit event details.

In one example, when activating manage event option, the user, also referred to as the creator, will have the option to edit details previously entered into the event editor interface 706. In another example, the user can also activate the cancel event option depicted in the event modifier interface 1204, in which the user (e.g., the user that created the event) can cancel the event. When cancelling the event, the event group remains active.

In another example, when the event is cancelled, the computing device sends a request to cancel the event to the computing system. The computing system receives the request, stores an indication that the event is canceled, sends a notification to each user that joined the event that the event has been canceled, and changes a status of the event to indicate that the event is canceled. The computing device displays the status of the event 1206 to indicate the event is canceled, as shown in FIG. 12B.

In one example embodiment, the event group remains active so that the users that joined the event can continue to chat in a chat session. In another example, when the event is cancelled, the interactive map section 1108 is updated to depict that the event location no longer existence. In another example, a leave event interface notification option is displayed as an indicator to the event creator or event users informing them that they have left the event.

When activating the add members option 1208 in the event modifier interface 1204 shown in FIGS. 12A and 12B, the user can add one or more users to the event unilaterally or based on user recommendations. In one example, the add members option 1208 is also an interactive graphical icon, emoji, avatar, or some other media icon object as shown in FIG. 12B. The computing device sends a request to the computing system to add the new user(s) specified and the computing system adds the users to the event. The computing system sends a response message to the computing device indicating that the user has successfully joined the event.

The computing device can display an indication to the user that they have successfully joined the event. In one example, the computing device displays a message indicating that the user has joined in a chat interface to allow the user to chat with other users that have joined the event. In another example, upon activating the edit event details in the event modifier interface 1204, the computing system displays the event editor interface 706 shown in FIG. 7. Once the event editor interface 706 is displayed, the user has the option to edit the details of the event as discussed in respect to FIG. 7.

Figure 13:
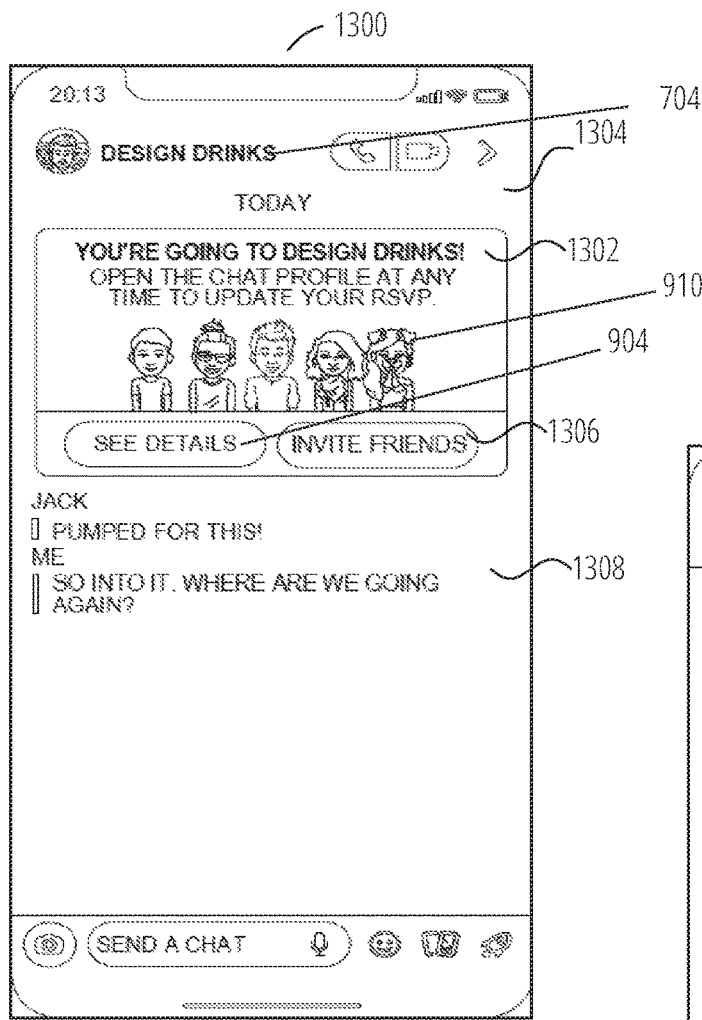
FIGS. 13A and 13B illustrate an example user interface 1300 depicting an event chat interface 1304 in accordance with one embodiment.
Figure 13:

FIGS. 13A and 13B illustrate example user interfaces 1300 and 1301 each depicting an event chat interface 1304 in accordance with one embodiment. As described above, when a user joins the event, the user gains access to an event chat interface, such as the event chat interface 1304 shown in FIG. 13A. The event chat interface 1304 depicts the event overlay component 704 title at the top portion, an event chat banner 1302, and an event chat section 1308.

In one example, the event chat banner 1302 displays a message that the user is attending the event and can be deleted after an initial viewing or a viewing after a predetermined period of time as describe above with respect to FIG. 6. In another example, the event chat banner 1302 also includes one or more avatars 910 associated with each user that has received and accepted the event corresponding to the event overlay component 704.

The event detail button 904 is included in the event chat interface 1304 and when selected activates the event content and associated details of the event overlay component 704. The user also has the option to activate a contact invite button 1306 in order to access a contact database or contact directory associated with the user of the device. Upon activating the contact database via the contact invite button 1306, the user has the option to invite additional contacts by selecting each contact to which to send an invite. The computing device transmits the event overlay component 704 to the associated computing device for each selected contact.

The event chat section 1308 is a real-time active chat session between users that have joined the event. As depicted in FIG. 13B, when one or more new users join the event, the new users avatars 1310 are displayed directly into the event chat section 1308. In another example, the user avatars 1310 are added into the separate section 914 and the event chat banner 1302 is updated to display "new group member" added. In one example, any messages in the chat session that occur after the new user has joined, will be visible by the new user and any messages in the chat session that occur prior to the new user having joined are not visible by the new user.

Figure 14:
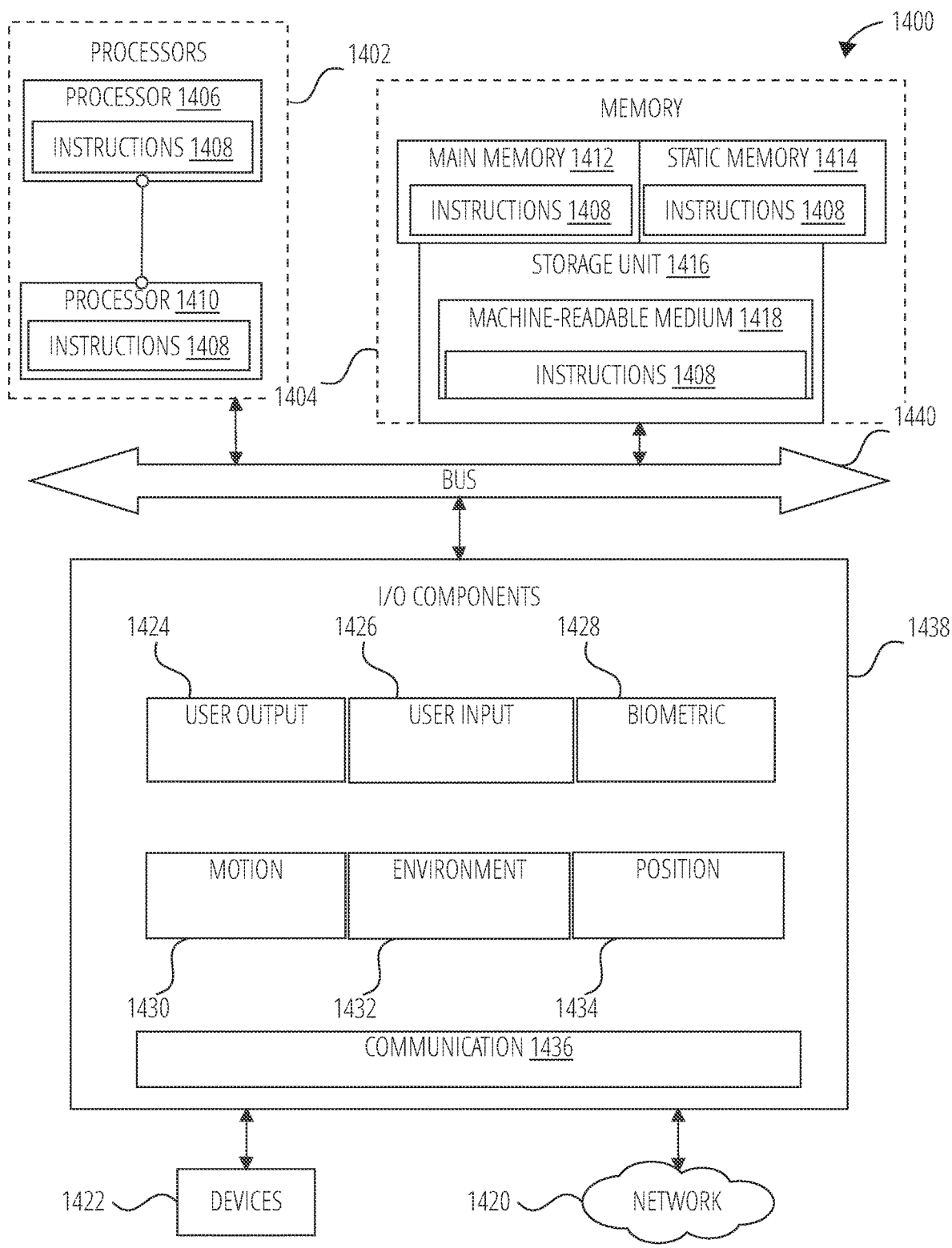
FIG. 14 is a diagrammatic representation of a machine in the form of a computer system within which a set of instructions may be executed for causing the machine to perform any one or more of the methodologies discussed herein, in accordance with some example embodiments.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines.

In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include processors 1402, memory 1404, and I/O components 1438, which may be configured to communicate with each other via a bus 1440. In an example embodiment, the processors 1402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1406 and a Processor 1410 that execute the instructions 1408.

The term "Processor" is intended to include multi-core processors that may comprise two or more independent processors (sometimes referred to as "cores") that may execute instructions contemporaneously. Although FIG. 14 shows multiple processors 1402, the machine 1400 may include a single Processor with a single core, a single Processor with multiple cores (e.g., a multi-core Processor), multiple processors with a single core, multiple processors with multiples cores, or any combination thereof.

The memory 1404 includes a main memory 1412, a static memory 1414, and a storage unit 1416, both accessible to the processors 1402 via the bus 1440. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the Processor's cache memory), or any suitable combination thereof, during execution thereof by the machine 1400.

The I/O components 1438 may include a wide variety of components to receive input, provide output, produce output, transmit information, exchange information, capture measurements, and so on. The specific I/O components 1438 that are included in a particular machine will depend on the type of machine. For example, portable machines such as mobile phones may include a touch input device or other such input mechanisms, while a headless server machine will likely not include such a touch input device. It will be appreciated that the I/O components 1438 may include many other components that are not shown in FIG. 14. In various example embodiments, the I/O components 1438 may include user output components 1424 and user input components 1426.

The user output components 1424 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location or force of touches or touch gestures, or other tactile input components), audio input components (e.g., a microphone), and the like.

In further example embodiments, the I/O components 1438 may include biometric components 1428, motion components 1430, environmental components 1432, or position components 1434, among a wide array of other components. For example, the biometric components 1428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1430 include acceleration sensor components (e.g., accelerometer), gravitation sensor components, rotation sensor components (e.g., gyroscope).

The environmental components 1432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1434 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 1438 further include communication components 1436 operable to couple the machine 1400 to a network 1420 or devices 1422 via respective coupling or connections. For example, the communication components 1436 may include a network interface Component or another suitable device to interface with the network 1420. In further examples, the communication components 1436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1422 may be another machine or any of a wide variety of peripheral devices (e.g., a peripheral device coupled via a USB).

Moreover, the communication components 1436 may detect identifiers or include components operable to detect identifiers. For example, the communication components 1436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1436, such as location via Internet Protocol (IP) geolocation, location via Wi-Fi® signal triangulation, location via detecting an NFC beacon signal that may indicate a particular location, and so forth.

The various memories (e.g., main memory 1412, static memory 1414, or memory of the processors 1402) or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed embodiments.

The instructions 1408 may be transmitted or received over the network 1420, using a transmission medium, via a network interface device (e.g., a network interface Component included in the communication components 1436) and using any one of several well-known transfer protocols (e.g., hypertext transfer protocol (HTTP)). Similarly, the instructions 1408 may be transmitted or received using a transmission medium via a coupling (e.g., a peer-to-peer coupling) to the devices 1422.

Figure 15:
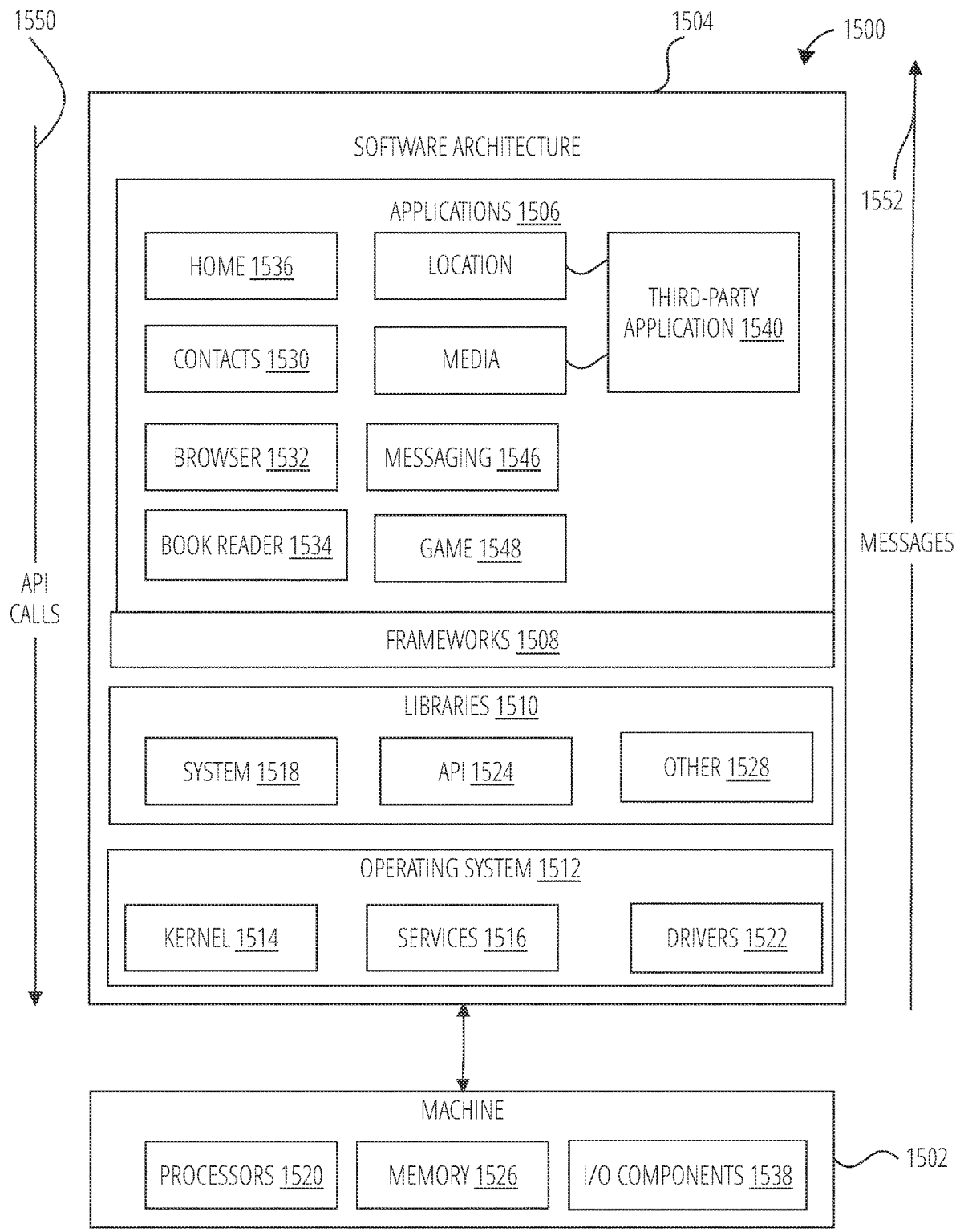
FIG. 15 is block diagram showing a software architecture within which the present disclosure may be implemented, according to an example embodiment.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, Processor management (e.g., scheduling), Component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1510 provide a low-level common infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a high-level common infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example embodiment, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. The e applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure.

In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method, comprising:
accessing, by a first computing device associated with a first user, a media content item;
generating, by the first computing device, an event overlay interface for creating an event invite for sending to a second computing device associated with a second user;
displaying, on a user interface of the first computing device, the event overlay interface as an overlay on top of the media content item;
receiving, by the first computing device, user selection of an event overlay component via the event overlay interface;
receiving, in response to receiving the user selection of the event overlay component, event information provided by the first user;
automatically determining a venue suggestion based on a location of the first computing device and the event information;
updating the event overlay component based on the event information and the venue suggestion;
causing the updated event overlay component to be overlaid on top of the media content item;
displaying the updated event overlay component and the media content item on the user interface of the first computing device; and
transmitting, to the second computing device, the media content item overlaid with the updated event overlay component, for display on the second computing device.

2. The method of claim 1, wherein the media content item is accessible for a predetermined time-limited duration, and wherein the media content item comprises an image, a video, or text.

3. The method of claim 1, wherein the event overlay content comprises time information, date information, and description information.

4. The method of claim 3, further comprising:
generating an event editor interface associated with the event overlay component; and
wherein the event overlay content is added via the event editor interface.

5. The method of claim 1, further comprising:
receiving a content collection comprising the updated event overlay component, the content collection comprising a collection of messages with media content;
providing an interactive join option to select the event overlay component associated with the updated event overlay component;
receiving a selection of the interactive join option from the second computing device; and
generating an event overlay messaging interface in response to receiving the selection of the interactive join option.

6. The method of claim 5, further comprising:
activating an event overlay messaging interface;
adding a second user associated with the second computing device to an event overlay directory associated with the event overlay component; and
displaying an event overlay status icon in the event overlay messaging interface, the event overlay status icon comprising a status notification that the second user has been added to the event overlay directory.

7. The method of claim 6, wherein the event overlay component further comprises a user profile associated with the second computing device, a geographic map component, a message component, a description section, and a media attachment component.

8. The method of claim 7, further comprising:
generating an avatar based on the user profile associated with the second computing device; and
displaying the associated avatar in the event overlay messaging interface.

9. The method of claim 1, further comprising:
displaying, prior to receiving the selection, a messaging icon within the user interface of the first computing device, the messaging icon for indicating a status for a message separate from the media content item.

10. The method of claim 9, wherein the messaging icon indicates whether the message separate from the media content item has been received, viewed, non-viewed, expired, or transmitted with respect to the first computing device.

11. A server system comprising:
a processor; and
a memory storing instructions that, when executed by the processor, configure the server system to performing operations comprising:
accessing, by a first computing device associated with a first user, a media content item;
generating, by the first computing device, an event overlay interface for creating an event invite for sending to a second computing device associated with a second user;
displaying, on a user interface of the first computing device, the event overlay interface as an overlay on top of the media content item;
receiving, by the first computing device, user selection of an event overlay component via the event overlay interface;
receiving, in response to receiving the user selection of the event overlay component, event information provided by the first user;
automatically determining a venue suggestion based on a location of the first computing device and the event information;
updating the event overlay component based on the event information and the venue suggestion;
causing the updated event overlay component to be overlaid on top of the media content item;
displaying the updated event overlay component and the media content item on the user interface of the first computing device; and
transmitting, to the second computing device, the media content item overlaid with the updated event overlay component, for display on the second computing device.

12. The server system of claim 11, wherein the media content item is accessible for a predetermined time-limited duration, and
wherein the media content item comprises an image, a video, or text.

13. The server system of claim 11, wherein the event overlay content comprises time information, date information, and description information.

14. The server system of claim 13, further comprising:
generating an event editor interface associated with the event overlay component; and
wherein the event overlay content is added via the event editor interface.

15. The server system of claim 11, wherein the instructions further configure the server system to perform operations comprising:
receiving a content collection comprising the updated event overlay component, the content collection comprising a collection of messages with media content;
providing an interactive join option to select the event overlay component associated with the updated event overlay component;
receiving a selection of the interactive join option from the second computing device; and
generating an event overlay messaging interface in response to receiving the selection of the interactive join option.

16. The server system of claim 15, further comprising:
activating an event overlay messaging interface;
adding a second user associated with the second computing device to an event overlay directory associated with the event overlay component; and
displaying an event overlay status icon in the event overlay messaging interface, the event overlay status icon comprising a status notification that the second user has been added to the event overlay directory.

17. The server system of claim 16, wherein the event overlay component further comprises a user profile associated with the second computing device, a geographic map component, a message component, a description section, and a media attachment component.

18. The server system of claim 17, wherein the operations further comprise:
generating an avatar based on the user profile associated with the second computing device; and
displaying the associated avatar in the event overlay messaging interface.

19. A non-transitory computer-readable storage medium, the computer-readable storage medium including instructions that when executed by a computer, cause the computer to performing operations comprising:
accessing, by a first computing device associated with a first user, a media content item;
generating, by the first computing device, an event overlay interface for creating an event invite for sending to a second computing device associated with a second user;
displaying, on a user interface of the first computing device, the event overlay interface as an overlay on top of the media content item;
receiving, by the first computing device, user selection of an event overlay component via the event overlay interface;
receiving, in response to receiving the user selection of the event overlay component, event information provided by the first user;
automatically determining a venue suggestion based on a location of the first computing device and the event information;
updating the event overlay component based on the event information and the venue suggestion;
causing the updated event overlay component to be overlaid on top of the media content item;
displaying the updated event overlay component and the media content item on the user interface of the first computing device; and
transmitting, to the second computing device, the media content item overlaid with the updated event overlay component, for display on the second computing device.

20. The non-transitory computer-readable storage medium of claim 19, wherein the instructions further configure the computer to perform operations comprising:
receiving a content collection comprising the updated event overlay component, the content collection comprising a collection of messages with media content;
providing an interactive join option to select an event overlay component profile associated with the updated event overlay component;
receiving a selection of the interactive join option;
activating an event overlay messaging interface in response to receiving the selection of the interactive join option;
adding a user associated with the first computing device to an event overlay directory associated with the event overlay component profile; and
displaying an event overlay status icon in the event overlay component profile, the event overlay icon comprising a status notification that the user has been added to the event directory.

* * * * *